United States Patent [19]

Komeya

[11] Patent Number: 4,915,676
[45] Date of Patent: Apr. 10, 1990

[54] POWER TRANSMISSION CHAIN
[75] Inventor: Akiyoshi Komeya, Kaga, Japan
[73] Assignee: Daido Kogyo Co., Ltd., Kaga, Japan
[21] Appl. No.: 314,092
[22] Filed: Feb. 22, 1989
[30] Foreign Application Priority Data Jun. 15, 1988 [JP] Japan .............................. 63-78355[U]

[51] Int. Cl.⁴ ............................................. F16G 13/06
[52] U.S. Cl. ..................................... 474/213; 474/214
[58] Field of Search ......................... 474/206, 211–217, 474/155–157; 59/5, 7, 84, 85, 88

[56] References Cited

U.S. PATENT DOCUMENTS 1,947,734 2/1934 Perry ..................................... 474/214
1,974,338 9/1934 McCann ............................... 474/214
4,758,209 7/1988 Ledvina ........................... 474/212 X Primary Examiner—Thuy M. Bui
Attorney, Agent, or Firm—Oblon, Spivak, McClelland, Maier & Neustadt

[57] ABSTRACT

Disclosed is a power transmission chain formed of a series of articulated units, each including a number of interleaved links each having a pair of pin-receiving holes at predetermined intervals and pivotally connected to the links of adjacent units by pins loosely fitted in the pin-receiving holes. The links are engageable with sprocket teeth for power transmission and the links are formed in an assymetrical shape in the direction of the pitch line and relative to a center line through a median point between the pin-receiving holes by bulging of one of the inner flanks defining a crotch portion of the link toward the other flank, part of the links being connected in a reverse direction to provide a different mechanism from others in meshing engagement with sprocket teeth.

5 Claims, 3 Drawing Sheets

Fig. 1
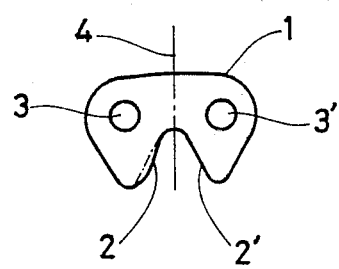
Fig. 2
(a)
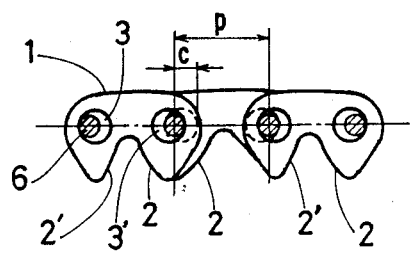
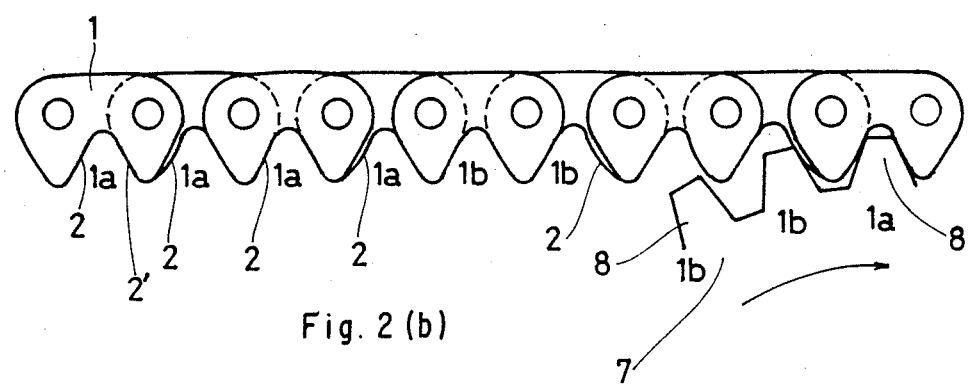
Fig. 2(b)

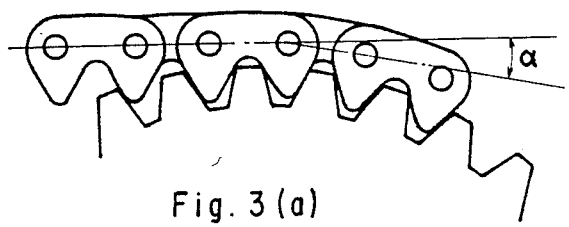
Fig. 3(a)
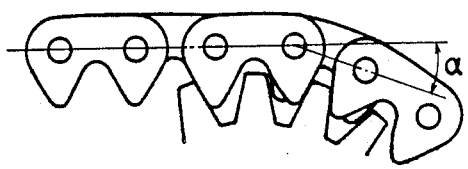
Fig. 3(b)
Fig. 4 (a) PRIOR ART
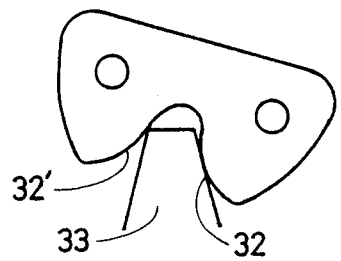
Fig. 4 (b) PRIOR ART
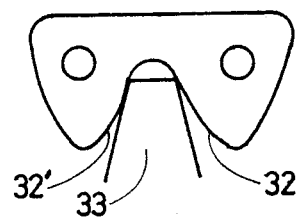
Fig. 4 (c)
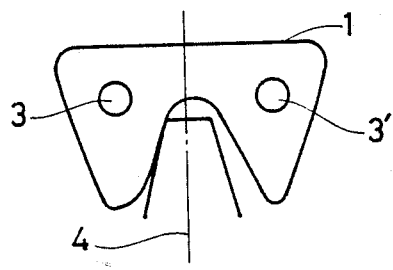

(a)
PRIOR ART (b)
PRIOR ART

POWER TRANSMISSION CHAIN

BACKGROUND OF THE INVENTION

1. Field of the Invention

This invention relates to a transimssion chain assembly suitable for use on vehicular transmissions or as power transmission means for industrial machines in general.

2. Description of the Prior Art

Conventional power transmission chains are generally composed of a series of articular units each consisting of a number of interleaved links of the same shape which are provided with a pair of apertures at a predetermined interval and pivotally connected to links of adjacent units by pins inserted in the apertures for articulation in the longitudinal direction. Therefore, when a claim of this type is engaged with a sprocket with uniformly spaced teeth, the respective articular units of the chain repeatedly make noises upon engagement with a sprocket tooth, which is called "tooth contact noises". As is well known in the art, the tooth contact noises which are annoying to the ear are produced by the engagement of the chain links with the sprocket teeth, and determined by the number N of the sprocket teeth and the number of revolutions R (rpm) of the sprocket, the noises containing an abnormally high-level component at the tooth contact frequency per second of $N \times R / 60$ (Hz).

An attempt to reduce such tooth contact noises is described in U.S. Pat. No. 4,342,560 in which a chain is constructed with two types of links, i.e., outside engagement type links and inside engagement type links. These two types of linkes are incorporated into a chain in either (1) an alternate pattern or (2) a pattern of random mixture. In this regard, Japanese Laid-Open Patent Application No. 60-188639 discloses a chain which is constructed with two types of links as shown in FIG. 6, namely, an outside engagement type link A which engages the sprocket teeth on its outer flank surface 21 and an inside engagement type link B which engages the sprocket teeth on its inner flank surface 22, forming a chain by repeating a link arrangement pattern of mixing more than three links of a different type.

In both of the prior art chains described above, the discomfortable noises are reduced by altering the basic frequency of the tooth contact noises of the chain and sprocket or the resonant frequency with respect to surrounding objects, with a view to dispersing the peak values of the noise.

However, in any case the conventional chain requires providing links of at least two different types, that is to say, links of inside engagement type and links of outside engagement type.

On the other hand, recently the technology for industrial machines or similar products has a trend toward lightweight and compactness, and the same applies to power transmission chains. In order to meet such a demand, it is effective to minimize the radius of the sprocket with which the chain engages, and reducing the number of sprocket teeth to minimize the radius of rotation of the chain. However, on a smaller sprocket, the chain links have a greater angle of flexion δ as shown in FIG. 3(b).

As shown in FIGS. 4(a) and 4(b), bulged or curved portions 32 and 32' are provided on the inner flanks which define crotch portions of inside engagement type links of the conventional chain, which engages the sprocket teeth on the side of the crotch portions. These bulged portions 32 and 32' are provided for the purpose of lessening the chordal actions, the cause of vibrations and noises, which occur to the chain as a result of fluctuations in speed caused by flexions at the time of engagement with the sprocket teeth. This is the same purpose as that of the chain links with a couple of roll pins. However, in case of a chain having the bulged portions on the inner flanks which define the crotch portion of each link, its angle of flexion δ becomes greater on a sprocket with a reduced number of teeth and therefore it becomes necessary to bulge out the inner flank portions to a greater degree to produce their effect sufficiently from an initial point to a to final point of engagement with a sprocket tooth. Consequently, larger bulged portions have to be provided on the inner flank portions of the chain links.

However, in the case where the inner flank portions are bulged out in to a greater degree, there arises a problem in that the engagement of one bulged portion 32 with a sprocket tooth 33 is interfered with by the other bulged portion 32' on the opposite side of the tooth, making normal engagement with the sprocket difficult.

A reduction of the in thickness of the sprocket teeth is conceivable as means for solving the just-mentioned problem, but it has a drawback in that the strength of the sprocket has to be sacrificed.

SUMMARY OF THE INVENTION

In view of the foregoing situations, the present invention has as its object the provision of a power transmission chain which can lessen the discomfortable annoying tooth contact noises resulting from the power transmitting engagement of the chain and sprocket.

It is another object of the invention to provide a power transmission chain which can engage sprocket teeth in a secure manner even when applied to a sprocket of lightweight and compmact form.

In accordance with the present invention, the foregoing objects are achieved by the provision of a power transmission chain of the type which is formed of a series of articular units each consisting of a number of interleaved links each with a couple of pin-receiving holes at a predetermined interval in the longitudinal direction and pivotally connected to links of adjacent units by pins loosely fitted in the pin-receiving holes, the links being engageable with sprocket teeth for power transmission, characterized in that the links are formed in an assymmetrical shape in the direction of the pitch line and relative to a center line through a median point between the pin-receiving holes, part of the links being connected in reversed state to have a different mechanism from other in engaging the sprocket teeth.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIG. 1 is a schematic side view of a chain link according to the invention;

FIG. 2(a) is a fragmentary side view of a chain having the links connected in alternately reversed directions;

FIG. 2(b) is a fragmentary side view of a chain having the links connected in reversed directions at intervals of a predetermined number of articular units;

FIG. 3(a) is a schematic side view of a chain in engagement with a large-size sprocket;

FIG. 3(b) is a schematic side view of a chain in engagement with a small-size sprocket;

FIGS. 4(a) and 4(b) are schematic illustrations of conventional link and sprocket tooth in engaged state;

FIG. 4(c) is a schematic illustration of a link of the invention in engagement with a sprocket tooth;

DESCRIPTION OF PREFERRED EMBODIMENTS

Figure 5:
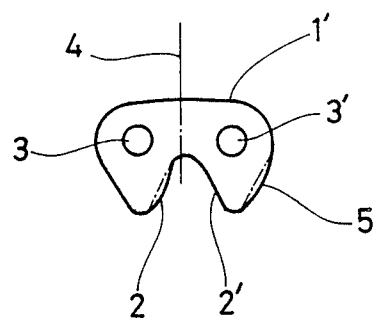
FIG. 5 is a schematic side view of a chain link of a modified construction in another embodiment of the invention.
Figure 6:
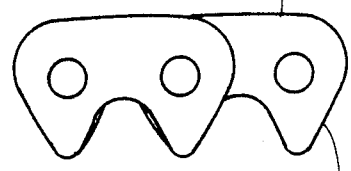
FIGS. 6(a) and 6(b) are schematic side views of conventional chain links of different shapes.
Figure 6:
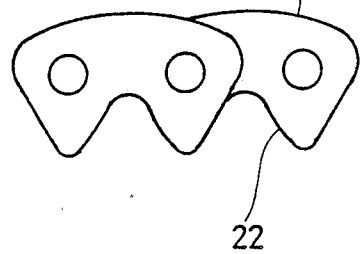

Referring first to FIG. 1, the reference numeral 1 denotes one of links which constitute a chain, for example, a silent chain. The link 1 is provided with a pair of pin-receiving holes 3 and 3' at a predetermined distance from each other, and pivotally connected to links of adjacent articular units in interleaved state by pins 6 loosely fitted in the holes 3 and 3' for articulation about an axis extending in a direction perpendicular to the length of the chain.

In the present invention, one of the inner flank surfaces which define a crotch portion is bulged out as indicated at 2, while the other inner flank surface is formed flat as indicated at 2'. Accordingly, in contrast to the conventional link which is formed symmetrically relative to the center line passing the median point between the two pin-receiving holes, the link 1 of the present invention is shaped assymmetrically relative to the center line 4 between the two pin-receiving holes.

In one form of the invention, the chain is formed by pivotally connecting a large number of links 1 of the construction described above, alternately reversing the direction of the links 1 such that the links alternately engage the sprocket teeth on the bulged inner flank surface 2 and the straight inner flank surface 2'. In this instance, as shown in FIG. 2(a), the dimensions of the connecting pins 6 and the holes 3 and 3" are so determined as to leave a large clearance c around the pins 6.

In connecting a large number of links 1 successively, the direction of the links may be alternately reversed as described above to locate the bulged and flat inner flank surface alternately on the front and rear sides of the crotch portions which engage the sprocket teeth. Alternatively, as shown in FIG. 2(b), a plural number of articular units consisting of links 1a which are oriented to engage the sprocket teeth on their bulged inner flank surfaces 2 may be connected alternately with a plural number of articular units consisting of reversed links 1b which are oriented to engage the sprocket teeth on the flat inner flank surfaces 2'. Further, the direction of the links on the chain may be reversed at random.

In any of the above-described connecting patterns, each pin-receving hole retains a clearance c as shown in FIG. 2(a).

As described above, the chain of the invention is constructed with links 1 which is provided with a bulged surface on one of the inner flanks on the opposite sides of a crotch portion. However, in case of the conventional chain links shown in FIGS. 4(a) and 4(b), bulged or curved surfaces are provided on the inner flanks on the opposite sides of a crotch, so that, when engaged with a small sprocket, the engagement of one bulged inner flank with a sprocket tooth is interfered with by the bulged inner flank on the opposite side, hindering normal engagement with the sprocket. In the present invention, the links 1 are formed in an assymmetrical shape relative to the center line 4 through the median point between the pin-receiving holes 3 and 3' as shown in FIG. 4(c), and therefore can be properly engaged with the sprocket teeth free of interference by the inner flanks on the non-engaging side. In addition, there is no need for reducing the thickness of the sprocket teeth at the sacrifice of the strength thereof.

When the inner flanks on the engaging side of the respective links are bulged out to a greater degree to secure the effect of reducing the chordal action on a sprocket with a reduced number of teeth, the flexion angle δ of the chain becomes smaller on a sprocket of a larger number of teeth, hindering perfect engagement of the flank surfaces 5 by the bulged surfaces of the crotch portions, resulting in abnormal and imperfect engagement with the sprocket. In the present invention, however, a large clearance is provided around the pins 6 in the pin-receiving holes 3 and 3', the clearance having a width sufficient for absorbing the bulged surface 2 on the engaging side of the crotch to ensure proper engagement between the chain and sprocket.

As described hereinabove, the chain of the present invention is provided with a greater bulge 2 on one side of the crotch of each link to lessen the chordan action on a sprocket with any number of teeth, providing a broader clearance around the pins in the pin-receiving holes to prevent imperfect engagement which might otherwide occur on a sprocket of a large number of teeth.

Further, the chain of the present invention is constructed with links of one type each formed in an assymmetrical shape relative to a center line through a median point between a pair of pin-receiving holes formed at a predetermined distance from each other, reversing the direction of the links alternately or at intervals of a predetermined number of links to let them engage the sprocket teeth in a different manner depending upon their direction. Therefore, it becomes possible to construct, by the use of links of one kind, a chain which has different mechanisms of engagement in a mixed state to disperse the peak values or to alter the fundamental frequency of the tooth contact noises for lessening the annoying noises.

FIG. 5 illustrate a link 1' in another embodiment of the invention, wherein, in addition to a bulged surface 2 which is provided on an inner flank surface on one side of the crotch in the same manner as in the foregoing embodiment, another bulged surface 5' is provided assymmetrically on one outer flank which faces the same direction as the bulged surface 2. In this modification, the chain is formed by pivotally connecting a large number of links, reversing the direction of the links in the same manner as in the foregoing embodiment.

Obviously, numerous modifications and variations of the present invention are possible in light of the above teachings. It is therefore to be understood that within the scope of the appended claims, the invention may be practiced otherwise than as specfically described herein.

What is claimed is:

1. A power transmission chain of the type which is formed of a series of articular units engaging sprocket teeth, each unit consisting of a number of interleaved links having a couple of pin-receiving holes at predetermined intervals and pivotally connected to links of adjacent units by pins loosely fitted in the pin-receiving holes, the links being engageable with said sprocket teeth for power transmission, wherein said links are formed of an asymmetrical shape in the direction of the pitch line and relative to a center line through a median point between said pin-receiving holes first and second inner flanks defining a crotch portion of said link, said first flank being bulged toward said second opposite inner flank and being connected in a reversed direction to adjacent links so as to provide a link mechanism which differs from other adjacent links in meshing engagement with said sprocket teeth.

2. A power transmission chain as defined in claim 1, wherein a bulged outer flank is provided asymmetrically so as to face the same direction as said first inner bulged flank.

3. A power transmission chain as defined in claim 1, wherein a direction of bulging of flanks of said links is alternately reversed link by link.

4. A power transmission chain as defined in claim 1, wherein a direction of bulging of flanks of said links is randomly reversed.

5. A power transmission chain as defined in claim 1, wherein a direction of bulging of flanks of said links is reversed unit by unit.

* * * * *